United States Patent [19]

Sutherland et al.

[11] Patent Number: 5,360,564

[45] Date of Patent: Nov. 1, 1994

[54] DISPERSANT VISCOSITY INDEX IMPROVERS

[75] Inventors: Robert J. Sutherland; Robert B. Rhodes, both of Houston, Tex.

[73] Assignee: Shell Oil Company, Houston, Tex.

[21] Appl. No.: 100,656

[22] Filed: Jul. 30, 1993

[51] Int. Cl.$^5$ .............................................. C10M 149/02
[52] U.S. Cl. .................................... 252/51.5 A; 525/92; 525/180; 525/190
[58] Field of Search ............................. 252/50, 51.5 A

[56] References Cited

U.S. PATENT DOCUMENTS

| | | | |
|---|---|---|---|
| 3,772,196 | 11/1973 | St. Clair et al. | 252/32.7 |
| 4,077,893 | 3/1978 | Kiovsky | 252/56 |
| 4,141,847 | 2/1979 | Kiovsky et al. | 252/51.5 |
| 4,234,435 | 11/1980 | Meinhardt et al. | 252/51.5 |
| 4,238,202 | 12/1980 | Trepka et al. | 44/332 |
| 4,358,565 | 11/1982 | Eckert | 252/50 |
| 4,409,120 | 10/1983 | Martin | 252/50 |
| 4,557,849 | 12/1985 | Eckert | 252/50 |
| 5,049,294 | 9/1991 | Van Zon et al. | 252/51.5 A |

*Primary Examiner*—Ellen M. McAvoy
*Attorney, Agent, or Firm*—James O. Okorafor

[57] ABSTRACT

An engine oil formulation comprising of a pour point depressant, a dispersant inhibitor package containing a reduced amount of ashless dispersant, a synthetic or mineral based oil or mixtures thereof, and a modified hydrogenated star polymer of a conjugated diolefin and a modified hydrogenated copolymer of conjugated diolefins and monoalkenyl arenes is disclosed. The engine oil has and exhibits improved dispersancy and rheological properties which is attributable to the presence therein of the modified hydrogenated star polymer of a conjugated diolefin and a modified hydrogenated copolymer of conjugated diolefins and monoalkenyl arenes. A process of producing the inventive engine oil composition is also disclosed.

10 Claims, No Drawings

DISPERSANT VISCOSITY INDEX IMPROVERS

FIELD OF THE INVENTION

This invention generally relates to viscosity index improvers and to dispersant viscosity index improvers. More particularly, this invention relates to an engine oil composition comprising a novel dispersant viscosity index improver.

BACKGROUND OF THE INVENTION

Viscosity index improvers are known in the art. Some of these viscosity index improvers also have dispersant properties and are referred to as dispersant viscosity index improvers.

Viscosity index improvers and/or dispersant viscosity index improvers are typically added to various lubricating oil compositions for purposes inclusive of improving the rheological properties of these compositions, and of improving the performances of the engines in which these compositions will subsequently be used in.

Generally speaking, these viscosity index improvers and/or dispersant viscosity index improvers are polymeric compounds. These polymeric additives can be linear or branched-chained. Alternatively, these polymeric additives may be star-shaped.

It is known in the art that these polymeric additives can be modified to incorporate functional groups which alter its properties. Functional groups which are typically incorporated into these additives include esters, amines, amides, imides, alcohols, sulfides, and nitriles. These functional groups may be either aliphatic or aromatic, branched or unbranched and may be introduced using a variety of methods such as working in solution, either oils or organic solvents, or working in the melt phase. The art indicates that the introduction of similar functionality by different methods can yield different products with unique properties. The skilled artisan will appreciate that a process practiced in solution phase may yield very different products when practiced in the melt phase. Changes in solvent, mass transport (mixing) and compatibility of reagents will alter the product composition, properties, yields and performance.

Although it is generally known that polymeric additives useful as viscosity index improvers and/or dispersant viscosity index improvers can be modified, it is not known which of these modifications will eventually be useful or desirable. For example, not all viscosity index improvers can be modified to have dispersancy properties, nor are all modified viscosity index improvers or dispersant viscosity index improvers useful in similar oil formulations. Thus, while a modified viscosity index improver may be useful in lubricating oil formulations, it may be of no value in the formulation of engine oils. The converse of this illustration is equally true.

As a result of the unpredictable nature of the behavior and utility of modified polymeric additives, it is the accepted wisdom in the art that extrapolations and/or generalization of the properties of one modified polymer to another is inaccurate and misleading. Thus, there continues to exist a need in the art to discover viscosity index improvers or dispersant viscosity index improvers modified or unmodified that have improved rheological properties and good engine performance when used in an oil composition.

SUMMARY OF THE INVENTION

It is a general object of this invention to provide an improved oil composition.

It is another object of this invention to provide an improved oil composition comprising a modified polymeric additive having and exhibiting improved rheological properties and engine performance.

It is a particular object of this invention to provide an improved engine oil composition comprising a modified hydrogenated star polymer of a conjugated diolefin and a modified hydrogenated copolymer of conjugated diolefins and monoalkenyl arenes having and exhibiting improved dispersancy and rheological properties.

An engine oil formulation having and exhibiting improved dispersancy and rheological properties comprising a synthetic or mineral based oil or mixtures thereof; a modified hydrogenated star polymer of a conjugated diolefin and a modified hydrogenated copolymer of conjugated diolefins and monoalkenyl arenes wherein said polymer has been modified by grafting with a polyamine containing at least one tertiary amine; and a detergent inhibitor package wherein the ashless dispersant content has been reduced by about 10–30 wt% from the normal treatment rate.

DESCRIPTION OF THE INVENTION

Broadly speaking, the materials needed for the practice of this invention are a modified hydrogenated star polymer of a conjugated diolefin and a modified hydrogenated copolymer of conjugated diolefins and monoalkenyl arenes, a detergent inhibitor package, a pour point depressant, and a synthetic or mineral based oil. The term modified polymer as used herein refers to the polymer which has been grafted with a polyamine containing at least one tertiary amine. Still broadly speaking the inventive engine oil formulation of this invention is produced by admixing suitable quantities of the necessary ingredients under suitable conditions.

THE MODIFIED POLYMER-DVII

The modified hydrogenated star polymer of a conjugated diolefin and a modified hydrogenated copolymer of conjugated diolefins and monoalkenyl arenes, sometimes hereinafter referred to as DVII polymer, useful in the practice of this invention is made by the free radical grafting of unsaturated carboxylic acid, anhydride or ester onto modified hydrogenated star polymer of a conjugated diolefin and a modified hydrogenated copolymer of conjugated diolefins and monoalkenyl arenes. The grafting is carried out in a device capable of imparting high mechanical energy to the compound. Such a device includes a Banbury mixer, a sigma blade mixer, and an extruder. The grafted compound is then reacted with a suitable amine to form a succinimide product.

The base polymer components of the inventive modified polymer can be generally described as a modified hydrogenated star-shaped polymer of conjugated dienes, and a modified hydrogenated linear diblock copolymer of conjugated dienes and monoalkene aromatic compounds. The star-shaped component comprises a major portion of from about 90 to 100 wt%, while the linear diblock copolymer comprises a minor portion of from about 0 to 10 wt%, of the total weight of the modified polymer of the present invention.

Polymers which are acceptable as the base polymer of the modified polymer useful in the present invention are known in the art, and include the hydrogenated derivatives of homopolymers and copolymers such as are described in U.S. Pat. No. 4,238,202, which is incorporated herein by reference. In general, these polymers may be polymers of one or more conjugated dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3 -octadiene and the like. Preferred conjugated diolefins are those containing from 4 to 8 carbon atoms. Moreover, one or more of the hydrogen atoms in the conjugated diolefins may be substituted with halogen. These polymers may also be copolymers of one or more of the aforementioned conjugated diolefins and one or more other monomers. Other monomers which may be used include aryl-substituted olefins such as styrene, various alkyl-substituted styrenes, alkoxy-substituted styrenes, vinyl naphthalene, alkyl-substituted vinyl naphthalenes and the like. These polymers which may be hydrogenated and which would then be useful in the method of the present invention include random polymers, tapered polymers and block copolymers.

Polymers useful in the method of the present invention also include hydrogenated and selectively hydrogenated derivatives of block copolymers and star or radial polymers, all of which are very well known in the art.

Linear block copolymers which may be hydrogenated and then functionalized to be used in the practice of this invention may, generally, be represented by the following general formula:

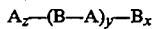

$$A_z—(B—A)_y—B_x$$

wherein:
A is a polymeric block comprising predominantly monoalkenyl aromatic hydrocarbon monomer units;
B is a polymeric block comprising predominantly conjugated diolefin monomer units;
x and z are, independently, a number equal to 0 or 1; and
y is a whole number ranging from 1 to about 15.

Radial polymers which may be hydrogenated and then functionalized to be used in the practice of this invention may be represented, generally, by the following general formula:

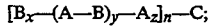

$$[B_x—(A—B)_y—A_z]_n—C;$$

and

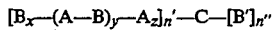

$$[B_x—(A—B)_y—A_z]_{n'}—C—[B']_{n''}$$

wherein:
A, B, x, y and z are as previously defined;
n is a number from 3 to 30;
C is the core of the radial polymer formed with a polyfunctional coupling agent;
B' is a polymeric block comprising predominantly conjugated diolefin units, which B' may be the same or different from B; and
n' and n" are integers representing the number of each type of arm and the sum of n' and n" will be a number from 3 to 30.

As used herein in connection with polymer block composition, predominantly means that the specified monomer or monomer type which is the principle component in that polymer block is present in an amount of at least 85% by weight of the block.

Base polymers prepared with diolefins will contain ethylenic unsaturation, and such polymers will be hydrogenated prior to reacting the base polymers with an alpha-beta ethylenically unsaturated compound containing carboxyl or carboxyl derivative functionality. In the process of this invention, when the polymer is hydrogenated, the hydrogenation may be accomplished using any of the techniques known in the prior art. For example, the hydrogenation may be accomplished such that both ethylenic and aromatic unsaturation is converted (saturated) or the hydrogenation may be accomplished selectively such that a significant portion of the ethylenic unsaturation is converted while little or no aromatic unsaturation is converted. Any of these methods could also be used to hydrogenate polymers which contain only ethylenic unsaturation and which are free of aromatic unsaturation.

Carboxyl or carboxyl derivative functionality is imparted into the base polymer by contacting the base polymer in an extruder with an $\alpha$-$\beta$ ethylenically unsaturated carboxylic acid reagent. Suitable $\alpha$-$\beta$ carboxylic acid reagents include the carboxylic acids per se and functional derivatives thereof such as anhydrides, esters, amides, imides, salts, acyl halides, nitriles and the like. The carboxylic acid reagent may be either monobasic or polybasic in nature. When the carboxylic acid reagent is polybasic, it is, preferably, dibasic, although tribasic and tetrabasic acids can be used. In general, the carboxylic acid reagent may be linear, branched, cyclic, substituted cyclic, aromatic, or substituted aromatic. In general, the acid portion of the carboxylic acid reagent will contain from 1 to about 12 carbon atoms. Useful monobasic alpha-beta unsaturated carboxylic acids include acrylic acid, methacrylic acid, cinnamic acid, crotonic acid, 2-phenylpropenoic acid and the like. Useful dibasic acids include maleic acid, fumaric acid, mesaconic acid, itaconic acid, citraconic acid and the like. Functional derivatives corresponding to each of the useful acids and methods for making such derivatives are well known in the art. Corresponding amides can be prepared by pyrolyzing an ammonium salt of the acid or by reacting the corresponding ester, anhydride or acid halide with an amine. The corresponding anhydride can be prepared by dehydrating the acid. Corresponding imides can be prepared by pyrolyzing certain amides. The acid salts can be prepared, for example, by reacting the acid with a metal hydroxide. The corresponding acyl halides can be prepared by reacting the acid or its anhydride with a halogenation agent such as phosphorous tribromide, phosphorous pentachloride, thionylchloride and the like. The corresponding nitriles are generally prepared by dehydrolizing the corresponding amide.

In general, a sufficient amount of carboxylic acid reagent will be combined with the polymer to incorporate from about 1 to about 50 functional groups, on average, per polymer chain. In this regard, it should be noted that the reaction between the carboxylic acid reagent and the polymer frequently will not proceed to completion. As a result, the amount of carboxylic acid reagent actually used will, generally, exceed the amount which is desired to be grafted to the base polymer by from about 10 to about 50%.

Any of the free radical initiators known in the prior art to be effective in a grafting reaction of the type herein contemplated can be used as the free radical initiator in the method of this invention. Suitable free radical initiators include the various organic peroxides and hydroperoxides as well as the various organic azo compounds. Typical organic peroxides include benzoyl peroxide, t-butyl peroxypivalate, 2,4-dichlorobenzoyl peroxide, decanoylperoxide, propionyl peroxide, hydroxyheptyl peroxide, cyclohexanone peroxide, t-butylperbenzoate, dicumyl peroxide, lauroyl peroxide and the like. Typical hydroperoxides include t-butyl hydroperoxide and 2,5-dimethyl-2,5-di(butylperoxy)hexane. Typical organic azo initiators include 2,2-azobis(2-methylpropionitrile), 2,2-azobis(2-methylvaleronitrile), 4,4'-azobis(4-cyanovaleric acid) and the like. In general, the free radical initiator will be used in a concentration within the range of from about 0.05 to about 0.50 wt% based on polymer. Particularly preferred free radical initiators include di t-butylperoxide; 1,1-bis(t-butylperoxy) 3,3,5-trimethylcyclohexane; t-butyl cumyl peroxide and 2,5-dimethyl-2,5-di(t-butylperoxy) hexane.

The grafted or partially modified polymer is then reacted with a suitable amine. The term suitable amine as used here means a saturated branched or unbranched aliphatic, primary or secondary polyamine containing 2 to 18 nitrogens, preferably a diamine such as N,N-dialkylaminopropylamines, but including higher polyamines such as alkylene polyamines, wherein pairs of nitrogen atoms are joined by alkylene groups of 2 to 4 carbon atoms, and containing at least one tertiary amine in the molecule. Preferred polyamines are of the formula:

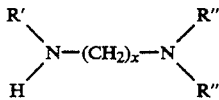

where x is 2 to 4

R' is hydrogen or an alkyl group comprising 1 to 12 carbon atoms

R" is independently selected alkyl groups comprising 1 to 12 carbon atoms. Examples of such preferred polyamines include: N,N-dimethylamniopropylamine, N,N-diethylaminopropylamine, N,N-dibutylaminopropylamine, N,N-dipropylaminopropylamine, N,N-dipentylaminopropylamino, N,N-dimethylaminoethylamine, N,N-dibutylaminoethylamine, N,N-dipropylaminoethylamine, N,N-dipentylaminoethylamine, N,N-dimethylaminopropyl-N'-methylamine, N,N-dimethylaminopropyl-N'-ethylamine, N,N-dimethylaminoethyl-N'-methylamine and N,N-diethylaminoethyl-N'-ethylamine.

The molar ratio of amine to carboxylic moiety grafted to the base polymer is typically between about 0.1:1 to 2:1, preferably between about 0.5:1 to 1.5:1, and most preferably about 1:1. Amidization is typically performed at a temperature of between about 150° C. to 250° C. for between about 15 seconds to 3.0 minutes.

The amount of amine incorporated in the viscosity index improver dispersant is preferably at least, on the average, one amine group per polymer molecule and less than that required to result in a polymer containing about 2.0% by weight nitrogen content. Most preferably, the aminated polymer contains less than about 0.5% by weight nitrogen. The maximum amount of amine that is beneficially incorporated in the viscosity index improver-dispersant is limited by the tendency of the polymer to attach itself to too many particles, and act like a sludge.

In both reaction steps of functionalization and amination it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess amine is employed, then it may be desirable to remove the excess from the reaction product. The excess amine may be removed in the extruder by applying a vacuum or with a stripping gas stream, which is subsequently vented from the extruder in a specially designed vent section.

In general, and in the method of this invention, the temperature may range from about 160° to about 250° C., depending upon the particular base polymer being processed, while the reaction between the base polymer and the carboxylic acid reagent takes place. Variation of the temperature in the different stages of the extruder is not necessary to the method of this invention and the temperature will therefore be maintained as nearly constant as possible as the polymer passes through the extruder except that the temperature in the inlet zone, i.e., the zone or zones where the feed materials are introduced may, generally, be maintained somewhat below the reaction zone temperature to maximize the life of the free radical initiator thereby improving grafting efficiency. In general, the channel depth of the high mechanical energy imparting device (extruder) may be varied within the range of from about 0.0005 to about 0.5 times the diameter of the screw housing with maximum depths occurring in those areas where the components are reacted and then again at or near the outlet of the extruder where the melt is devolatilized. In transition, the channel depth may be varied to insure that the desired degree of mechanical shear and mixing have been imparted on the materials being processed.

In comparison to other commercially available dispersant viscosity index improvers the modified polymer prepared as disclosed herein has numerous advantages. These advantages include but are not limited to its availability in solid form which permits base oil flexibility and can result in a decrease in transportation costs, and superior rheological properties as will be later shown by the examples and tables contained herein.

OILS

Generally speaking, all synthetic and mineral based oils or mixtures thereof are suitable in the practice of this invention. These synthetic oils are exemplified by polyalphaolefins and polymethacrylate esters. Mineral based oils useful herein are highly refined petroleum distillates such as solvent extracted or catalytically dewaxed oils. Examples of such mineral based oils include aromatic oils, non-aromatic oils, and naphthenic oils. The selection of an appropriate oil or mixture of oils is well within the competence of those of skill in the art.

DETERGENT INHIBITOR PACKAGE

The inventive oil formulation contains a detergent inhibitor package, which is sometimes hereinafter simply referred to as a DI package. The DI package typically contains a detergent, an ashless dispersant, an antioxidant, a friction modifier, an antiwear agent, and a corrosion inhibitor. It is known in the art that DI packages are not equally effective or useful. In a broad sense, whether or not a given DI package will be useful in a particular application depends particularly on its antiwear, antioxidant, detergent and dispersant components.

The DI package of this invention can be distinguished by the presence therein of a reduced amount of ashless dispersant. This reduction which can range from about 10% to about 30%, is compensated for by the improved dispersancy properties exhibited by the modified hydrogenated star polymer of a conjugated diolefin and a modified hydrogenated copolymer of conjugated diolefins and monoalkenyl arenes. Thus, one advantage of this invention is that it permits the usage of reduced amounts of materials resulting in significant cost-savings.

POUR POINT DEPRESSANTS

Another component of the inventive oil formulation is a pour point depressant. Examples of useful pour point depressants include Acryloid® 155 and Acryloid® 160.

QUANTITIES AND PROCESS

In formulating the oil compositions of this invention, it has been found that using certain quantities of the useful materials is desirable. It is therefore recommended that a typical inventive oil formulation comprise as follows: from about 75 to 95 wt% of base oil; from about 0.1 to 5 wt% of the DVII polymer; from about 0.1 to 1% of a pour point depressant; and from about 5 to 20 wt% of a DI package. It is noted that the amount of the DVII polymer in the formulation will vary depending upon the kinematic viscosity target and the intended base oil mixture. The appropriate handling of such variations is within the competence of those skilled in the art.

The process of formulating the inventive oil composition involves the following steps: making a concentrated base oil solution of the DVII polymer. This concentrate typically contains from about 2 to 20 wt% of the polymer in oil. A preferred concentrate contains from about 10 to 15 wt% of the polymer in oil. Temperatures in the range of from about 100° to 130° C. are suitable for this aspect of the process. The polymer concentrate is then suitably admixed using a suitable mixing device with predetermined amounts of oil, a DI package, and a pour point depressant at a suitable blending temperature. While temperatures within the range of from about 60° to 120° C. are useful, temperatures from about 80° to 100° C. are preferred. The thoroughly blended composition represents the finished inventive oil formulation. This finished product can then be packaged for introduction into commerce.

This invention is further illustrated by the following examples and tables.

EXAMPLE 1

A one drum kettle was charged with 108.3 kg of HVI 100N base oil which was then heated to 110° C. To the oil was added 14.8 kg of the inventive DVII polymer. The mixture was heated and stirred for about 16 hours until the polymer was completely dissolved to form a concentrate.

EXAMPLE 2

A one drum kettle was charged with 107 kg of a mineral base oil which was then heated to 70° C. To the base oil was added 0.29 kg of a pour point depressant, 24 kg of a DI package "A" (which contains a reduced amount of ashless dispersant) and 12.2 kg of the inventive DVII concentrate prepared in Example 1. The kettle was heated and its contents stirred for about 1 hour to make an SAE 15W-40 motor oil formulation with a kinematic viscosity of 14.4 cSt at 100° C. and a CCS viscosity of less than 3500 cP at −15° C. Samples 1,2 and 5 are representative of the oil formulation made by the procedure of this example.

EXAMPLE 3

A one drum kettle was charged with 132.8 kg of a mineral base oil which was then heated to 70° C. To the base oil was added 0.36 kg of a pour point depressant, 30 kg of DI package "A" (which contains a reduced amount of ashless dispersant), and 16.2 kg of a competitive dispersant-OCP VI improver. The kettle was heated and its contents stirred for about 1 hour to make an SAE 15W-40 motor oil formulation with a kinematic viscosity of 14.4 cSt at 100° C. and a CCS viscosity of less than 3500 cP at-15° C. Sample 6 is representative of this example.

EXAMPLE 4

Measurement of Rheological Properties

A 30 gallon kettle was charged with 45.6 kg of a mineral base oil which was then heated to 70° C. To the base oil was added 4 kg of a base oil concentrate of a comparative star-configuration hydrogenated, polymer made from conjugated diolefin monomers (a non-dispersant VI improver), 0.12 kg of a pour point depressant, and 8.4 kg of a DI package "A" (which contains a reduced amount of ashless dispersant). The kettle was heated and its contents were stirred for about 1 hour to make an SAE 15W-40 motor oil formulation with a kinematic viscosity of 14.4 cSt at 100° C. and a CCS viscosity of less than 3500 cP at −15° C. Sample 7 is representative of this example.

Similar oil formulations were prepared from DI packages "B" and "C". Package "B" contains reduced amounts of ashless dispersant (similar to "A") while package "C" contains the normally recommended level of ashless dispersant. Samples 3, 4, 9A and 9B contain the inventive DVII and DI package "B". Sample 7A contains the non-dispersant VI improver and DI package "C".

Various rheological properties of some of the samples of Examples 3 and 4 were measured. The results of these measurements are shown in Table I.

TABLE I

| SAMPLE NOS. | KV[1] | CCS[2] | TP1-MRV[3] | TBS[4] | PSS[5] % VISCOSITY LOSS |
|---|---|---|---|---|---|
| 1 | 14.3 | 3,295 | 13,725 | 3.82 | — |
| 2 | 14.5 | 3,259 | 13,375 | 3.77 | 6.3% |
| 3 | 14.4 | 3,248 | 12,161 | 3.71 | 7.7% |
| 4 | — | — | 12,655 | 3.77 | — |
| 5 | 14.4 | — | 12,700 | 3.88 | 4.5% |
| 6 | 14.4 | 3,431 | 16,714 | 3.89 | 10.0% |
| 7 | 14.0 | 3,091 | 11,941 | 3.83 | 2.0% |
| 8 | 12.5–16.3 | <3,500 | <30,000 | >3.7 | 2.0% |

[1]Kinematic viscosity measured at 100° C., in cSt.
[2]Cold cranking simulation viscosity measured at −15° C., in cP.
[3]Temperature Profile 1 - Mini Rotary Viscometer, ASTM D-4684, measured at −20° C., in cP.
[4]Tapered bearing simulation viscosity measured at 150° C. and 1 × 10$^6$ s$^{-1}$ in cP.
[5]Permanent shear stability test measured according to ASTM D-3945.

From Table I, it is observed that the rheological properties of inventive samples (1–5) are improved over comparative sample 6 in the areas of CCS viscosity, TP1-MRV viscosity and permanent shear stability.

TABLE IA

| DVII | KV, cSt @ 100° C. | CCS, cP −25° C. |
|---|---|---|
| SAE J300 | 9.3 (min)–12.5 (max) | 3500 (max) |
| Shellvis ®(non-DVII) | 10.7 | 3245 |
| Shell DVII (Inventive Comp) | 10.9 | 3269 |
| Paratone 855 | 11.0 | 4142 |
| Acryloid 954 | 10.8 | 3472 |
| Amoco 6565 | 10.7 | 3527 |
| Texaco TLA 7200 | 10.8 | 3598 |

SAE 5W-30 oils containing Exxon 100N, and Lubrizol DI

Fully formulated oils were prepared from the above polymers, Lubrizol DI packages, Acryloid pour depressants and Exxon base stocks. Exxon 100N LP was used for the SAE 5W-30 oils. The oils in the table were all blended in Exxon 100N LP and DI package was composed of Lubrizol 8855 at 13.2% plus Lubrizol 8563 CD booster at 2.21%, Acryloid 155 pour point depressant at 0.5% and the polymer concentrates. The oils were blended to about 11 cSt viscosity at 100° C. and the CCS was measured at −25° C.

The above table shows clearly that the inventive DVII polymer has improved low-temperature performance in SAE 5W-30 motor oil blends. The competitive examples were not able to make SAE 5W-30 oils because they did not meet the CCS requirement for low-temperature viscosity. The CCS measures the low-temperature high-shear rate viscosity of a motor oil and is related to the ability to crank and start an engine at low ambient temperatures. The industry trend is toward the increased use of SAE 5W-30 and 10W-30 oils in the field. This trend will require better low-temperature properties from the VI improvers used in these applications. The inventive polymer is clearly better in CCS performance than the comparative commercial polymers. The non-dispersant VI improver Shellvis ® 200, is included as a reference to show the properties of typical non-functionalized VI improvers.

EXAMPLE 5

Sequence VE Engine Test Data for Inventive Oil Formulation

Various engine tests were performed using some of the samples of Examples 3 and 4. The results of these tests are shown in Table II.

TABLE II

| SAMPLE NOS. | AES[1] | RCS[2] | AEV[3] | PSV[4] | ACW[5] | MCW[6] |
|---|---|---|---|---|---|---|
| API SG | 9.0[a] | 7.0[a] | 5.0[a] | 6.5[a] | 5.0[b] | 15[a] |
| 1 | 8.9 | 8.4 | 6.3 | 6.3 | 1.0 | 1.6 |
| 3 | 8.9 | 7.3 | 6.2 | 6.8 | 0.9 | 1.1 |
| 4 | 8.9 | 8.2 | 5.6 | 5.7 | 1.0 | 3.0 |
| 5 | 9.0 | 7.0 | 5.0 | 6.5 | 5.0 | 15 |
| 6 | 8.7 | 7.7 | 6.7 | 6.2 | 1.0 | 3.7 |
| 7 | 7.3 | 4.8 | 4.9 | 6.2 | 10.5 | 15 |
| 7A | 8.9 | 8.1 | 7.1 | 6.7 | 7.7 | 15 |
| 9A | 9.0 | 7.8 | 6.5 | 6.5 | 1.2 | 3.8 |
| 9B | 8.9 | 7.3 | 6.4 | 6.7 | 1.0 | 1.3 |

[1]AES refers to the Average Engine Sludge rating.
[2]RCS refers to the Rocker Cover Sludge rating.
[3]AEV refers to the Average Engine Varnish rating.
[4]PSV refers to the Piston Skirt Varnish rating.
[5]ACW refers to the Average Cam Wear.
[6]MCS refers to the Maximum Cam Wear.
[a]represents the minimum acceptable value.
[b]represents the maximum acceptable value.

Samples 7 and 7A represent the low reference and high reference tests respectively. Samples 1, 3, 4, 9A and 9B show the improvement in engine tests results when the inventive DVII is used in the low reference formulation. This demonstrates the dispersancy properties of the inventive DVII. In the Sequence VE test, Sample 6 can be compared to the inventive DVII tests and is seen to show similar results.

EXAMPLE 6

Sequence II-D and Sequence III-E Data for Inventive Oil

The tests mentioned in Example 6 were performed using the inventive oil formulation. The results are shown in Table III.

TABLE III

| | TEST DATA | API | SG |
|---|---|---|---|
| SEQ. II-D | | | |
| AVE. RUST | 8.84 | 8.5 | MIN |
| STUCK LIFTER | NONE | NONE | |
| SEQ. III-E | | | |
| VIS INC. | +137% | +375% | MAX |
| PSV | 9.14 | 8.9 | MIN |
| RLD | 8.76 | 3.5 | MIN |
| AES | 9.61 | 9.2 | MIN |
| STUCK PR | NONE | NONE | |
| CAM/LIFTER WEAR | | | |
| AVE. | 6.3 | 30 | MAX |
| MAX | 25 | 64 | MAX |
| OIL CONS. | 2.64 | 5.1 | MAX |

The data in Table III reveals that the inventive oil formulation met or exceeded the minimum pass requirements for all of the performed tests. It is noted that most of these tests were performed with sample 5 which contains the DVII and DI package "A".

CAT G2 Engine Test Data for Inventive Oil Formulation.

TABLE IV

| SAMPLE NO. | TFG %[1] | WTD[2] | RSCL[3] |
|---|---|---|---|
| P/F | 80% MAX | 300.0 MAX | 13 MAX |
| 5 | 72% | 153.3 | 0 |
| 6 | 59% | 159.7 | 0 |

CRC L-38 Engine Data for Inventive Oil Formulation.

TABLE V

| SAMPLE NO. | BEARING WT LOSS mg | PISTON SKIRT VARNISH |
|---|---|---|
| P/F | 40 mg MAX | 9.0 MIN |
| 5 | 34.3 | 9.8 |
| 5 | 28.9 | 9.8 |
| 6 | 31.1 | 9.8 |
| 6 | 21.9 | 9.8 |

CAT 1K Engine Test for Inventive Oil Formulation.

TABLE VI

| SAMPLE NO. | TGF[1] | WTD[2] | IGF[4]% | TOP LAND HEAVY CARBON |
|---|---|---|---|---|
| P/F | 26 MAX | 330 MAX | — | 4% MAX |
| 5 | 14 | 193.9 | 16 | 0 |
| 6 | 9 | 267.3 | 81 | 0 |

As a further demonstration of the dispersant properties of the inventive DVII additional engine test results are shown for the inventive oil formulation-samples 5 and 6. Tables IV, V and VI show the results of the CAT 1G2, CRC L-38 and CAT 1k engine tests respectively, for each oil. Both oils passed all three tests with only a few minor differences between them.

GM 6.2L Engine Test Average Wear

TABLE VII

| | A | B | C | SPEC |
|---|---|---|---|---|
| DVII (of invention) | 0.52* | 0.68 | 0.31 | <0.5 |
| ShellVis 200 | 0.98 | 1.23 | 0.39 | <0.5 |

*Lower numbers indicate better performance.

Table VII shows a comparison between the inventive DVII and a non-dispersant star polymer. The data clearly indicates that the added dispersancy from the inventive DVII results in reduced amounts of wear in each of the three tests (A, B, C) that were run.

While this invention has been described in detail for purposes of illustration, it is not to be construed as limited thereby but is intended to cover all changes and modifications within the spirit and scope thereof.

That which is claimed is:

1. An engine oil formulation having and exhibiting improved dispersancy and rheological properties comprising: a synthetic or mineral based oil or mixture thereof; a modified hydrogenated star polymer of a conjugated diolefin and a modified hydrogenated copolymer of conjugated diolefins and monoalkenyl arenes; wherein said polymer has been modified by grafting with an $\alpha,\beta$-ethylenically unsaturated compound containing carboxyl or carboxl derivative functionality and subsequently with a polyamine containing at least one tertiary amine; and a detergent exhibitor package wherein the ashless dispersant content has been reduced by about 10–30 wt% from the normal treatment rate.

2. An engine oil formulation as in claim 1 comprising from about 75 to about 95 wt% of said synthetic or mineral based oil or mixtures thereof.

3. An engine oil formulation as in claim 1 wherein said synthetic or mineral based oil is selected from the group consisting of polyalpha olefins, polymethacrylate esters, aromatic oils, non-aromatic oils, naphthenic oils, or mixtures thereof.

4. An engine oil formulation as in claim 1 wherein said modified hydrogenated star polymer of a conjugated diolefin and a modified hydrogenated copolymer of conjugated diolefins and monoalkenyl arenes is present in an amount of from about 0.1 to about 5 wt% based on the total weight.

5. An engine oil formulation as in claim 1 wherein said detergent inhibitor package is present in an amount of from about 5 to about 20 wt%.

6. An engine oil formulation as in claim 1 wherein said pour point depressant is present in an amount of from about 0.1 to about 1.0 wt% based on total weight.

7. An engine oil formulation having and exhibiting improved dispersancy and rheological properties comprising:
   (a) from about 75 to about 95 wt% of a synthetic oil, or mineral based oil, or mixtures thereof;
   (b) from about 0.1 to about 5 wt% of a modified hydrogenated star polymer of a conjugated diolefin and a modified hydrogenated copolymer of conjugated diolefins and monoalkenyl arenes wherein said polymer has been modified with an $\alpha,\beta$-ethylenically unsaturated compound containing carboxyl or carboxyl derivative functionality and subsequently with a polyamine containing at least one tertiary amine; and
   (c) from about 5 to about 20 wt% of a detergent inhibitor package and a detergent inhibitor package wherein the ashless dispersant content has been reduced by about 10–30 wt% from the normal treatment rate.

8. A process of producing an engine oil formulation having and exhibiting improved dispersancy and rheological properties involving:
   (a) preparing a concentrated base oil solution containing from about 2 to about 20 wt% of a modified hydrogenated star polymer of a conjugated diolefin and a modified hydrogenated copolymer of conjugated diolefins and monoalkenyl arenes wherein said polymer has been modified with an $\alpha,\beta$-ethylenically unsaturated compound containing carboxyl or carboxyl derivative functionality and subsequently with a polyamine containing at least one tertiary amine; and
   (b) admixing the product of (a) with a predetermined amount of a synthetic or mineral based oil or a mixture thereof; and a dispersant inhibitor package containing a reduced amount of ashless dispersant.

9. A product made by the process of claim 8.

10. A process as in claim 8 wherein said concentrate contains from about 10 to about 15 wt% of said modified hydrogenated star polymer of a conjugated diolefin and a copolymer of conjugated diolefins and monoalkenyl arenes.

* * * * *